UNITED STATES PATENT OFFICE.

WILLIAM W. BEEBE AND EDWIN E. DAVIS, OF LOS ANGELES, CALIFORNIA.

PLASTIC COMPOSITION.

1,170,038.     Specification of Letters Patent.     Patented Feb. 1, 1916.

No Drawing.     Application filed April 9, 1915. Serial No. 20,276.

*To all whom it may concern:*

Be it known that we, WILLIAM W. BEEBE and EDWIN E. DAVIS, citizens of the United States, residing at Los Angeles, in the county of Los Angeles, State of California, have invented a new and useful Plastic Composition, of which the following is a specification.

This invention relates to a plastic composition, one of the objects of the invention being to provide a mixture which can be molded readily into different shapes, to form fence posts, flower pots, door casings, and like devices.

A further object is to provide a plastic composition which permits nails, staples and the like to be inserted readily into the articles made from the composition.

Another object is to provide a composition which is fireproof and waterproof.

With the foregoing and other objects in view the invention consists of the following ingredients combined substantially in the proportions stated, viz: Pumice (crushed to a mesh from six to thirty)—one and one half parts. Gypsum—one and one half parts. Portland cement—one part. To each cubic foot of a mixture of the above ingredients are added ten gallons of a mixture of sal ammoniac and water, one pound of sal ammoniac being used to each one hundred pounds of water.

In preparing the composition, the pumice crushed to the mesh stated is mixed with the plaster and cement. The salammoniac is then mixed with the water in the proportion stated after which ten gallons of the liquid mixture are thoroughly mixed with each cubic foot of the dry mixture. With the product thus obtained various articles such as fence posts, interior ornamental work, flower pots, vases, urns, door casings, laundry and toilet appliances and the like, can be molded. The objects thus produced can be rendered perfectly smooth by means of sandpaper and can be suitably waterproofed and painted in the same manner as wood.

The use of pumice as one of the main ingredients is advantageous because it reduces the weight of the manufactured article and allows nails, staples, screws, etc., to be inserted readily into the article and also permits it to be smoothed by means of sandpaper. The gypsum assists the mixture in setting quickly so that the number of forms necessary to produce articles is materially reduced and the cost of manufacture correspondingly lessened. The Portland cement constitutes the binder between the other ingredients, giving the article hardness and strength while the salammoniac assists in effecting a quick setting of the mixture, causing the cement to set as quickly as the plaster.

Articles produced by the means herein described will be found to be entirely water and fire proof, especially if a suitable water proofing mixture is applied to the surface of the produced article.

In addition to the articles hereinbefore mentioned, it might be stated that the composition herein described will be found especially useful in the manufacture of caskets, coffins, etc.

What is claimed is:—

A plastic composition consisting of crushed pumice, one and one half parts, gypsum one and one half parts, and Portland cement one part, the same forming a dry mixture, combined with a wet mixture of salammoniac one pound and water one hundred pounds, ten gallons of the wet mixture being used with each cubic foot of the dry mixture.

In testimony that we claim the foregoing as our own, we have hereto affixed our signatures in the presence of two witnesses.

WILLIAM W. BEEBE.
EDWIN E. DAVIS.

Witnesses:
R. L. CABE,
W. A. YOUNG.